US012090727B2

(12) United States Patent
Ranganathan

(10) Patent No.: US 12,090,727 B2
(45) Date of Patent: Sep. 17, 2024

(54) DEEP DRAWABLE CLAD SYSTEMS AND METHODS THEREOF

(71) Applicant: EMS Engineered Materials Solutions, LLC, Attleboro, MA (US)

(72) Inventor: Rajesh Ranganathan, Attleboro, MA (US)

(73) Assignee: EMS Engineered Material Solutions, LLC, Attleboro, MA (US)

( * ) Notice: Subject to any disclaimer, the term of this patent is extended or adjusted under 35 U.S.C. 154(b) by 0 days.

(21) Appl. No.: 18/162,843

(22) Filed: Feb. 1, 2023

(65) Prior Publication Data

US 2024/0075709 A1 Mar. 7, 2024

Related U.S. Application Data

(60) Provisional application No. 63/404,016, filed on Sep. 6, 2022.

(51) Int. Cl.
*B32B 15/01* (2006.01)
*C21D 8/02* (2006.01)

(52) U.S. Cl.
CPC ............ *B32B 15/01* (2013.01); *C21D 8/0236* (2013.01); *B32B 2250/03* (2013.01); *C21D 2251/02* (2013.01)

(58) Field of Classification Search
None
See application file for complete search history.

(56) References Cited

U.S. PATENT DOCUMENTS

| 2,985,955 | A | * | 5/1961 | Rostoker | B23K 35/005 228/262.44 |
| 3,060,557 | A | * | 10/1962 | Rostoker | B23K 20/227 428/662 |
| 3,890,110 | A | * | 6/1975 | Glaski | C23C 16/14 428/685 |
| 4,011,981 | A | * | 3/1977 | Danna | B23K 1/19 228/208 |
| 4,612,259 | A | * | 9/1986 | Ueda | B32B 15/013 228/190 |

(Continued)

FOREIGN PATENT DOCUMENTS

| CN | 105033459 A | * | 11/2015 | ............ B23K 26/14 |
| GB | 1430587 A | * | 3/1976 | ........... B23K 20/233 |
| JP | 2000153383 A | * | 6/2000 | |

OTHER PUBLICATIONS

American Elements, "Melting point of Common Metals, Alloys, & Other Materials", https://www.americanelements.com/meltingpoint.html, accessed Jun. 20, 2024 (Year: 2024).*

(Continued)

*Primary Examiner* — Seth Dumbris
(74) *Attorney, Agent, or Firm* — Smith Gambrell & Russell LLP

(57) ABSTRACT

A clad system for prevention of intermetallic formation. The clad system includes a first layer, a liner, and a second layer. The liner prevents the formation of intermetallics between the first layer and second layer during processes that may lead to intermetallic formation. The clad system may be bonded together using cold roll bonding and other such processes.

10 Claims, 5 Drawing Sheets

(56) References Cited

U.S. PATENT DOCUMENTS

| | | | | |
|---|---|---|---|---|
| 4,806,438 A | * | 2/1989 | Hinotani | B23K 35/005 |
| | | | | 428/685 |
| 2001/0054638 A1 | | 12/2001 | Hardwick | |
| 2004/0170860 A1 | * | 9/2004 | Hardwick | B23K 35/004 |
| | | | | 428/662 |
| 2017/0298493 A1 | | 10/2017 | Mennucci et al. | |

OTHER PUBLICATIONS

The International Search Report/Written Opinion released by the U.S. Patent & Trademark Office as International Search Authority on Jul. 10, 2023 for corresponding International Patent Application No. PCT/US2023/061757; 8 pages.

* cited by examiner

DEEP DRAWABLE CLAD SYSTEMS AND METHODS THEREOF

REFERENCE TO RELATED APPLICATIONS

This application is a United States Non-Provisional patent application of U.S. Provisional Application Ser. No. 63/404,016, filed Sep. 6, 2022, which is hereby incorporated by this reference in its entirety.

TECHNICAL FIELD

This disclosure relates to deep drawable clad systems and methods thereof.

BACKGROUND

Niobium-clad (Nb-clad) stainless steel has been demonstrated to be a viable material for use in several applications including, but not limited to, bipolar plates in Polymer Electrolyte Membrane Fuel Cells (PEMFCs). While various materials were considered for use in bipolar plates, metals offer advantages in low-cost mass production, excellent thermal conductivity and mechanical strength (Hong, S. T., Journal of Power Sources (2007)). The niobium-stainless steel system has been shown to have excellent corrosion resistant properties due in part to niobium forming a passive film of oxide over the metal surface that is very stable and leads to a high electrode potential. This oxide layer protects the metal from further deterioration.

To make defined parts which have extreme forming operations (such as bending, stamping etc.) the clad system needs to be annealed. The annealing temperatures for niobium can range from about 1600° F. up to about 2100° F. depending on the application and type of properties required. Due to the high ductility of niobium and stainless steel, the Nb-clad stainless steel can be potentially used even in deep draw (e.g. punching) operations. Studies have shown, however, that the formability and stability of a Nb-clad stainless steel in a deep draw operation is jeopardized due to formation of an intermetallic at the interface of the niobium-stainless steel interface (Hong, ST., Journal of Trans. Nonferrous Met. Soc. (2009)). This intermetallic may occur while annealing the system at approximately 1800° F. (i.e. 982° C.). It was found in this study that a $Fe_2Nb_3$ (I phase) formed at the interface between niobium and stainless steel. This intermetallic layer is brittle and fractures while being stressed, causing failure ofNb-clad stainless steel parts following deep draws (e.g. punches).

Therefore, there is a need for a system that addresses the shortcomings discussed above.

SUMMARY

It is to be understood that this summary is not an extensive overview of the disclosure. This summary is exemplary and not restrictive and it is intended to neither identify key or critical elements of the disclosure nor delineate the scope thereof. The sole purpose of this summary is to explain and exemplify certain concepts of the disclosure as an introduction to the following complete and extensive detailed description.

The present disclosure relates to a clad system. A clad system includes two, three, four, five, or more layers of various materials and thicknesses and at least one liner, wherein one or more liner(s) are cladded to the other layers. Any number of layers and liners can be used to form clad systems for various applications. Thicknesses and materials of layers and liners may also be varied to fit various applications.

The layers can be made of metals. A first layer may be selected from a group of metals exhibiting desired properties including but not limited to corrosion resistance and oxide layer formation. The first layer material can be selected from a group including but not limited to niobium, tantalum, titanium, and other such materials and have a thickness of about 0.25 mm up to about 5 mm. A second layer material may be selected from a group of metals including but not limited to iron, iron alloys, steel, stainless steel, steel alloys, and other such materials and have a thickness of about 0.25 mm up to about 5 mm.

A liner also can be made of metal. The liner material can be selected from a group of metals including but not limited to copper, nickel, platinum, and the other such materials and have a thickness of about 0.05 mm up to about 3 mm. The liner serves to prevent the formation of intermetallics between the other layers (e.g. a first layer of niobium and a second layer of stainless steel) of the system. The liner material and thickness should be chosen to accomplish this. The liner prevents the formation of intermetallics between the other layers during heat treatment, annealing, and other such processes.

The present disclosure relates to a method of forming a clad material. The clad material is resistant to formation of intermetallics between two or more layers of the clad material. Intermetallic formation is prevented during processes including but not limited to heat treatment, annealing, and other such processes. The method includes providing a first layer, providing a liner, providing a second layer, and bonding the first layer, the liner, and the second layer together. Bonding can be accomplished through a variety of processes known in the art including but not limited to cold roll bonding, plating, and the like.

BRIEF DESCRIPTION OF THE DRAWINGS

The features and components of the following figures are illustrated to emphasize the general principles of the present disclosure. Corresponding features and components throughout the figures can be designated by matching reference characters for the sake of consistency and clarity.

FIG. 5A illustrates a cladded component with no liner causing intermetallics. FIG. 5B illustrates a cladded component with interliner and devoid of intermetallics.

DETAILED DESCRIPTION

Figure 1:
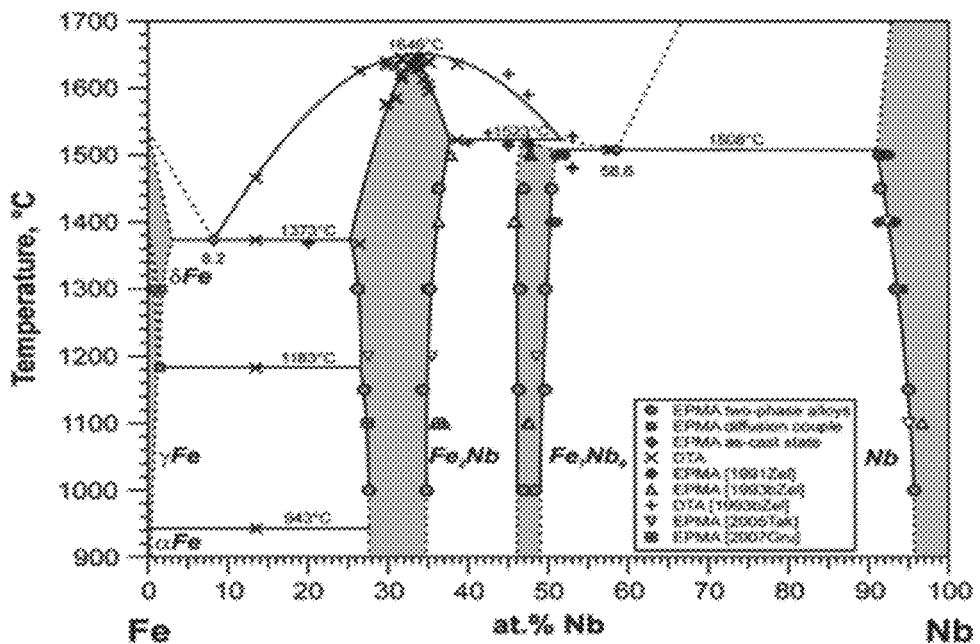
FIG. 1 depicts a phase diagram occurring between niobium and iron (Nb—Fe).

The present disclosure can be understood more readily by reference to the following detailed description, examples, drawings, and claims, and their previous and following description. However, before the present compositions, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

I. Definitions

Unless defined otherwise, all technical and scientific terms used herein have the same meaning as commonly understood by one of ordinary skill in the art to which this disclosure belongs. Although any compositions, methods and materials similar or equivalent to those described herein can be used in the practice or testing of the present disclosure. All publications mentioned are incorporated herein by reference in their entirety.

The use of the terms "a," "an," "the," and similar referents in the context of describing the presently claimed invention (especially in the context of the claims) are to be construed to cover both the singular and the plural, unless otherwise indicated herein or clearly contradicted by context.

Recitation of ranges of values herein are merely intended to serve as a shorthand method of referring individually to each separate value falling within the range, unless otherwise indicated herein, and each separate value is incorporated into the specification as if it were individually recited herein.

Use of the term "about" is intended to describe values either above or below the stated value in a range of approx. +/−10%; in other embodiments the values may range in value either above or below the stated value in a range of approx. +/−5%; in other embodiments the values may range in value either above or below the stated value in a range of approx. +/−2%; in other embodiments the values may range in value either above or below the stated value in a range of approx. +/−1%. The preceding ranges are intended to be made clear by context, and no further limitation is implied. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

As used herein, "bond strength" refers to the level of adhesion between two layers of material, such as metals, joined together through a bonding process. Bonding processes may include cold rolling, plating, and the like. "Bond strength" may be tested by a variety of methods known in the art including tension tests, tensile shear tests, slide shear tests, and the like.

As used herein, "cladding" may refer to a process, wherein a layer of metal is formed to a layer of another metal through diffusion, deformation, cold rolling, and other processes known in the art. Such a process may provide advantageous properties, such as protection of one of the metals, decreased material cost, and other various properties known in the art.

As used herein, "intermetallic" may refer to a compound comprising proportions of two or more elemental metals. An intermetallic may comprise crystal structures and properties different than those of the two or more elemental metals comprising the intermetallic. The formation of intermetallic layers may result from processes that cause self-diffusion of a first material into a second material, and vice versa. As non-limiting examples, such processes may comprise heat treatment procedures, annealing procedures, and other such processes known in the metallurgic arts. Intermetallics may become brittle and lead to mechanical failure of a material.

As used herein, a "deep draw" may refer to a process, wherein a material formed into a shape through stamping. In a deep draw, a material may be placed onto a die and punched with a machine at an elevated force to form a desired size and shape of a product. A material that can withstand such a process without exhibiting mechanical failure is said to be "deep drawable."

Other terms known in the art relating to the present disclosure exist and are to be understood as used in the art, unless otherwise specified.

II. Deep Drawable Clad Systems

The present disclosure can be understood more readily by reference to the following detailed description, examples, drawings, and claims, and their previous and following description. However, before the present systems and/or methods are disclosed and described, it is to be understood that this disclosure is not limited to the specific systems and/or methods disclosed unless otherwise specified, as such can, of course, vary. It is also to be understood that the terminology used herein is for the purpose of describing particular aspects only and is not intended to be limiting.

The present disclosure relates to clad systems 10. The clad systems 10 can include layers 100, 300 of materials bonded to and separated by a liner 200, as discussed in detail below. Such clad systems 10 may comprise niobium. The clad systems can include materials other than niobium, based upon the desired properties. As non-limiting examples, materials exhibiting corrosion resistance, acid tolerance, oxide layer formation, high drawability, electrochemical performance, contact resistance, other such desirable properties, and any combination thereof may be chosen for layers 100, 300 of clad systems 10 according to aspects of the present disclosure. Required parameters will vary depending on the desired application. In such aspects, the propensity of a material to form an oxide layer which acts as a passivating layer to prevent corrosion in acidic environments can be a desirable property of a selected material for use in the clad system 10. Non-limiting examples of such materials are tantalum, titanium, vanadium, platinum, and other such materials known in the art. Niobium may be selected for comprising the above properties in addition to cost benefits. For example, tantalum, which shares many of the same properties with niobium, is about 4 up to about 6 times the cost of niobium.

The present disclosure relates to the prevention of forming intermetallics between adjacent materials/layers (e.g., FIG. 5A) at an interface in a clad system 10 through the use of a liner 200. As discussed above, the clad system 10 includes layers 100, 300 of materials. Such materials/layers may comprise one, two, three, or more metals. Metals can include, but are not limited to, a first metal comprising niobium, tantalum, titanium, and other such materials and a second metal comprising iron, iron alloys, steel, stainless steel, steel alloys, and other such materials known in the art. In such an aspect, a first metal may be selected to optimize corrosion resistance while a second may provide alternate benefits including but not limited to structural stability, durability, cost savings, and the like. These two layers/materials may form a first layer 100 and a second layer 300. A first layer 100 may comprise a first surface 102, a second surface 104, and a thickness 110. A second layer 300 may comprise a first surface 302, a second surface 304, and a thickness 310.

Further, the thicknesses 110 and 310 of a first layer 100 and a second layer 300 may be chosen depending on requirements of a chosen application for the clad system 10. For example, the thicknesses of the layers 100, 300 can be chosen based upon the environment of application for each finished clad system 10. As a non-limiting example, in applications in which corrosion is to be avoided, a first layer 100 comprising a corrosion resistant material (e.g., niobium) may be desired. In such aspects, the first layer 100 may be made thinner to reduce costs while a second layer 300 may comprise a thickness 310 greater than that of the first layer 110. In such an aspect, a greater thickness 310 of the second layer 300 compared to a thickness 110 of the first layer 100 provides increased structural integrity and cost savings. In a further such aspect, when an overall thickness of a clad system 10 is fixed as required by a number of reasons given an application, a second layer 300 may need an increased thickness 310 compensate the thickness that is lost due to thinner first layer 100. This can be done in cases in which the material of that second layer 300 may be cheaper than the material of the first layer 100, but still supplements properties absent from the material of the first layer 100, or reduced when made thinner, or complementary properties of the first layer 100. In such example, a first layer 100 may comprise a material that is more expensive than the material of a second layer 300.

As an additional, non-limiting example, a first layer 100 comprising a corrosion resistant material (e.g., niobium) may comprise a greater thickness 110 compared to other applications if the first layer 100 is used in a highly acidic environment. As previously discussed, the thickness of a second layer 310 may be determined based on the requirement of the thickness of the overall system 10 in view of the first layer's thickness 110. For example, increased acidity leads to needs for increased thickness 110 of the first layer 100. As a non-limiting example, thicknesses 110, 310 of the first layer 100 and second layer 300 may range from about 0.1 mm up to about 5 mm. Thicknesses 110, 310 may also be selected from ranges including but not limited to about 0.5 mm up to about 4.5 mm, about 1.0 mm up to about 4.0 mm, about 1.5 mm up to about 3.5 mm, about 2.0 mm up to about 2.5 mm, and all ranges in between. An overall thickness of a clad system 10 will be determined by requirements of a particular application.

Figure 3:
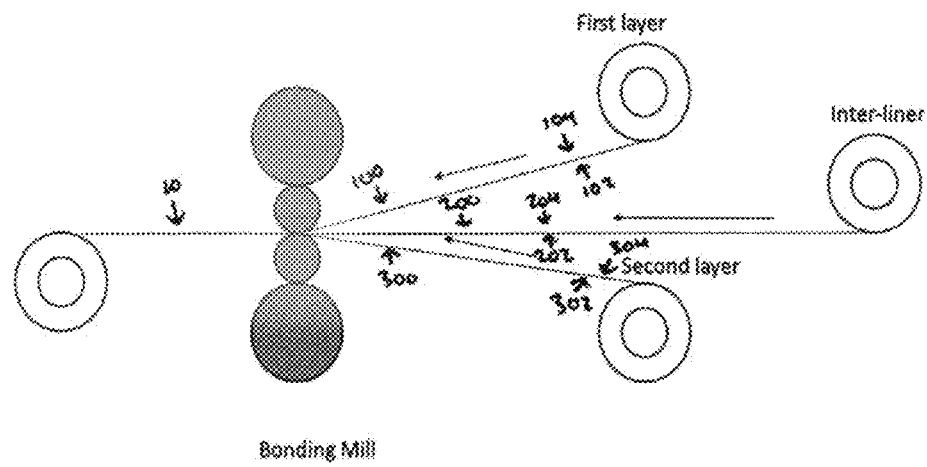
FIG. 3 depicts a schematic process of cladding according to aspects of the current disclosure.

The clad systems 10 can also include a liner 200. In an aspect, a liner 200 may comprise a first surface 202, a second surface 204, and a thickness 210. One of the surfaces 202, 204 of the liner 200 can be configured to abut one of the surfaces 102,104 of a first layer 100. In addition, the surfaces 202, 204 of the liner 200 may further be configured to abut one of the surfaces 302, 304 of the second layer 300, opposite the side of the surface 202, 204 that abuts one of the surfaces 102, 104 of the first layer, as shown in FIG. 3. The liner 200, as described herein, can include a material capable of negating intermetallic formation between the first layer 100 and the second layer 300 (e.g., see FIG. 5B).

In an aspect, the liner 200 can be made of a variety of materials with desirable properties. The desirable properties include, but are not limited to, an elevated melting point, resistance to intermetallic formation, formability following material treatment, elevated ductility, and sufficient thickness, though other properties may also be desired, as known in the art. In an aspect, a liner 200 is made from a material that is able to withstand deep drawing processes such that a clad system 10 is deep drawable overall. In an aspect, the liner can be a metal.

In addition, the liner 200 can be chosen based upon the materials of the first layer 100 and second layer 300 to ensure ease of cladding between the three (first layer 100, liner 200, and second layer 300). In such an aspect, certain parameters are used in determining ease of cladding. As non-limiting examples, the ductility of a liner 200, the compatibility of crystal structures (e.g. face-centered cubic (FCC), body-centered cubic (BCC), hexagonal close packed (HCP), and the like) within a liner 200 and a first layer 100 and a second layer 300, and other such factors known in the art may be considered.

A material used for the liner 200 can be chosen to have an elevated melting point occurring at a temperature above that of known processes where intermetallics form. Temperatures required for these processes may be determined by the metals and materials involved and other such factors known in the art. In such an aspect, processes include heat treatments, anneals, and other such processes occurring at temperatures that result in the diffusion of two metals into each other. Such diffusion results in a phase that is brittle and more likely to exhibit mechanical failure (i.e. an intermetallic). As a non-limiting example, an intermetallic may form through annealing processes occurring at approximately 1800° F. (i.e. approximately 982° C.) for a niobium-304 stainless steel system. A material may be chosen for the liner 200 having an elevated melting point occurring above the temperatures associated with such processes. Such a material selection may prevent the liner 200 from melting and diffusing into the first layer 100, the second layer 300, or a combination thereof preventing the melting and subsequent diffusion of the liner 200 can therein provide a system 10 that prevents the formation of intermetallics. An exemplary phase diagram showing the interaction of niobium and 304 stainless steel is provided in FIG. 1. The diagram displays exemplary temperatures and compositions that may lead to the formation of intermetallic phases (shaded areas). In such aspects, said exemplary temperatures and compositions may be present during treatment processes including, but not limited to, annealing as described above. The presence of a liner 200 with an elevated melting point, as described above, can prevent intermetallic formation that would occur otherwise.

Figure 2A:
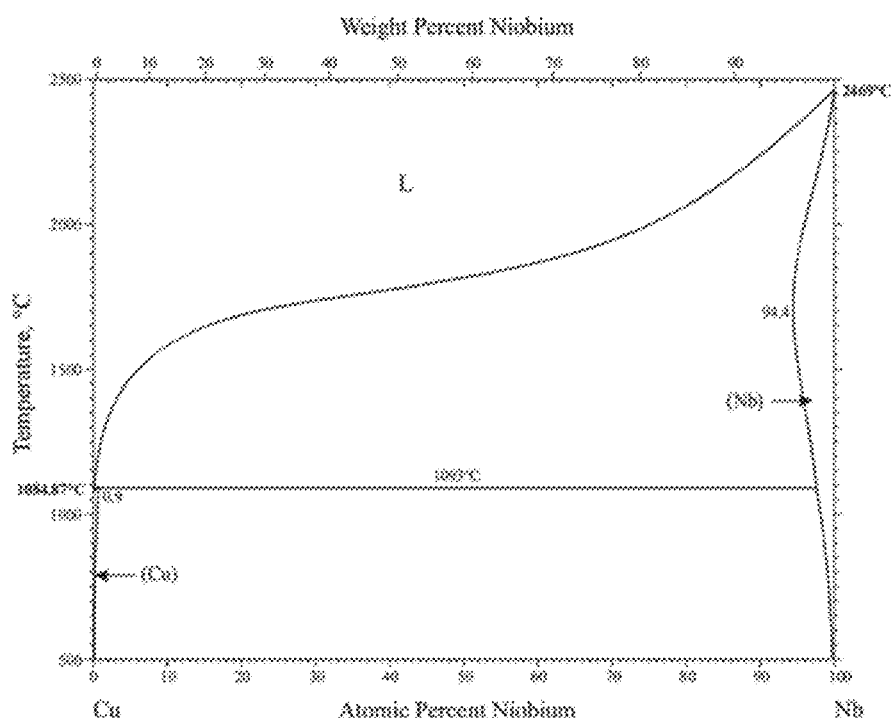
FIGS. 2A-2B depict phase diagrams occurring between niobium and copper (FIG. 2A) and between iron and copper (FIG. 2B).
Figure 2B:
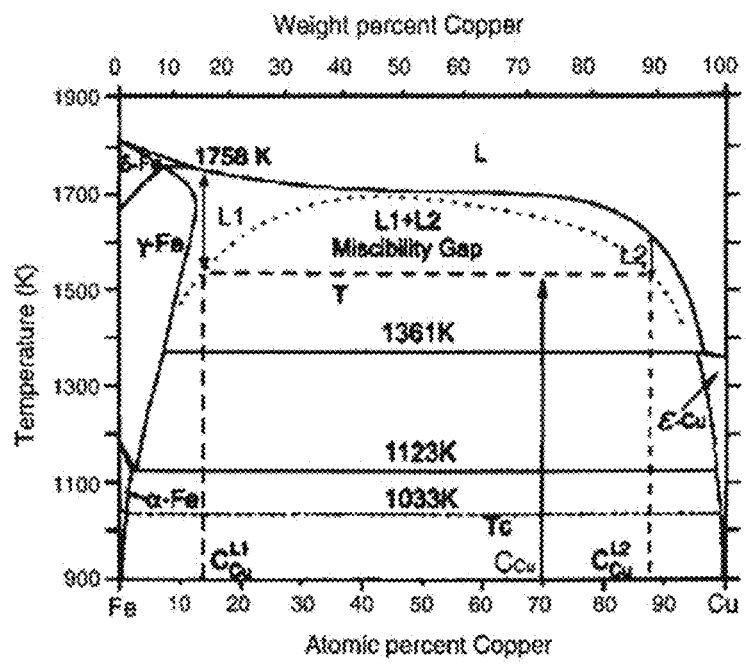
Figure 5A:
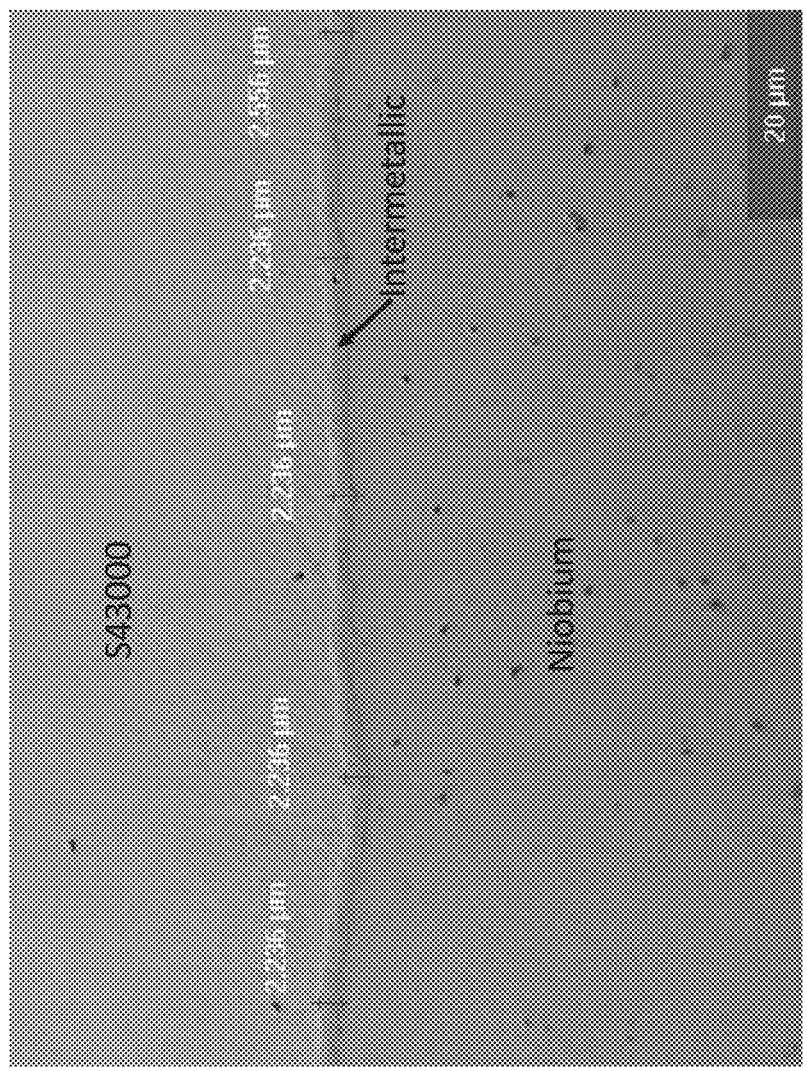
FIGS. 5A-5B illustrate embodiments of the present invention.
Figure 5B:
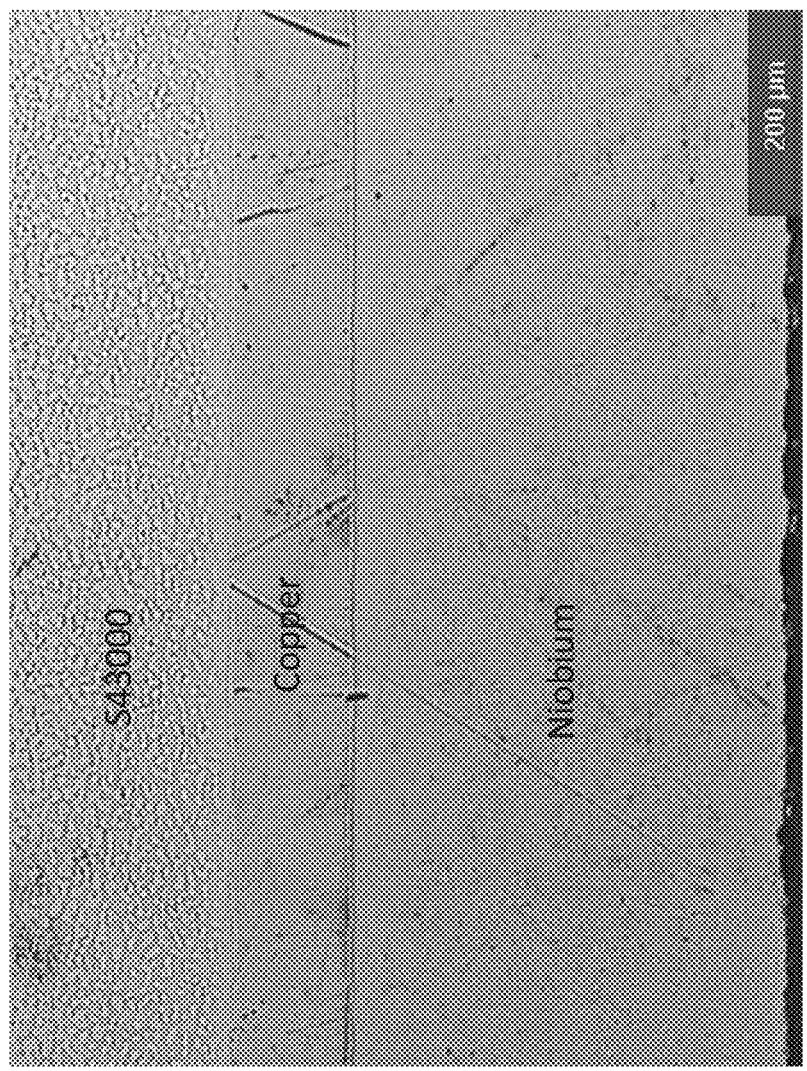

As discussed above, a material for a liner 200 is chosen as to avoid intermetallic formation depending on its inherent interactions with materials of a first layer 100 and a second layer 300. FIG. 5A illustrates an example of intermetallics at a cross section of a cladded material using a niobium-304 stainless steel annealed at approximately 1850° F. It is an inherent property of certain materials that they may or may not form specific phases upon variations in material composition and temperatures. As a non-limiting example, a liner 200 may be copper. The material for a first layer 100 may be niobium. The material for a second layer 300 may be stainless steel. In such an example, FIGS. 2A-2B display a phase diagram between the liner 200 made of copper and the first layer 100 made of niobium (FIG. 2A), as well as a phase diagram between the liner 200 made of copper and the second layer 300 made of a steel alloy (FIG. 2B). Given that the exemplary system 10 comprises a first layer 100 of niobium abutting a liner 200 of copper further abutting a second layer 300 of a steel alloy, FIGS. 2A-2B display the lack of a formation of an intermetallic phase occurs between the relevant components. Likewise, FIG. 5B illustrates a cross section showing NB/Cu/S430 annealed at 1850 F without the presence of intermetallic. In such aspects, the prevention of an intermetallic formation is inherent to the materials selected. In such an aspect, additional materials may be selected embodying the same properties. Such materials are provided throughout the disclosure.

Material treatments relating to formability may comprise heat treatments and other treatments known in the art. Elevated ductility may comprise a level of ductility that facilitates rolling of materials such that they sufficiently clad and form a final product. Ductility of materials may be related to certain material properties. As a non-limiting example, ductility may relate to the ability of a material to elongate under tensile stress while still maintaining its yield and tensile strengths. In such an aspect, yield strength, tensile strength, and elongation percentage assist in quantifying a materials ductility. Table 1 below provides examples of common ductile materials, and relevant mechanical properties, that are able to be readily formed and roll bonded. It is to be understood that Table 1 is exemplary and does not encompass all ductile materials that could be utilized according to embodiments of the present disclosure.

TABLE 1

Examples of Ductile Materials

| Material | Yield Strength (MPa) | Tensile Strength (MPa) | Elongation (%) |
|---|---|---|---|
| Stainless Steel Austenitic | 215 | 505 | 60 |
| Aluminum | 20 | 90 | 25 |
| Copper | 75 | 220 | 55 |
| Niobium | 30 | 69 | 30 |

As discussed above the liner 200 has a thickness 210. In such aspects, the thickness 210 should be of a sufficient size to prevent intermetallic formations between the first layer 100 and second layer 300. In such an aspect, a thickness 210 should be sufficient to allow the liner 200 to serve as a barrier between a layer 100 and a second layer 300 to prevent diffusion of a layer 100 into a layer 300 during heat treatments. Liner thickness 210 may be limited by required final properties of a system 10. As a non-limiting example, a copper liner 200 may be limited due to cost, weight, and conductivity restraints. In such example, an elevated thickness 210 of a copper liner 200 may increase conductivity of the system 10 to an undesirable level. As a non-limiting example, a thickness 210 may be selected from a range of about 0.05 mm up to about 3 mm. A thickness 210 may also be selected from other ranges including but not limited to about 0.1 mm up to about 2.9 mm, about 0.2 mm up to about 2.8 mm, about 0.3 mm up to about 2.7 mm, about 0.4 mm up to about 2.6 mm, about 0.5 mm up to about 2.5 mm, about 0.6 mm up to about 2.4 mm, and all ranges in between. As non-limiting examples, such metals may comprise copper, nickel, platinum, and other such metals known in the art. Such metals display desired characteristics for a liner 200 including but not limited to being inert where they are passive and corrosion resistant in acidic environments. As a non-limiting example copper may comprise a material further comprising desirable properties due to its absence of intermetallic formations with layers 100 and 300, as shown in FIGS. 2A-2B, ease of cladding, elevated ductility, cost, and other such factors.

A clad system 10, as described herein, may comprise two, three, four, five, or more metallic layers of various materials and thicknesses, with liners found between the layers. As a non-limiting example, such a system 10 is useful in applications where only one surface is exposed to a corrosive (e.g., acidic) environment while another layer supplies the system 10 strength, durability, weldability, and other such desired properties. As a non-limiting example, such systems may be used as proton-exchange membrane fuel cell (PEMFC) bipolar plates.

Figure 4A:
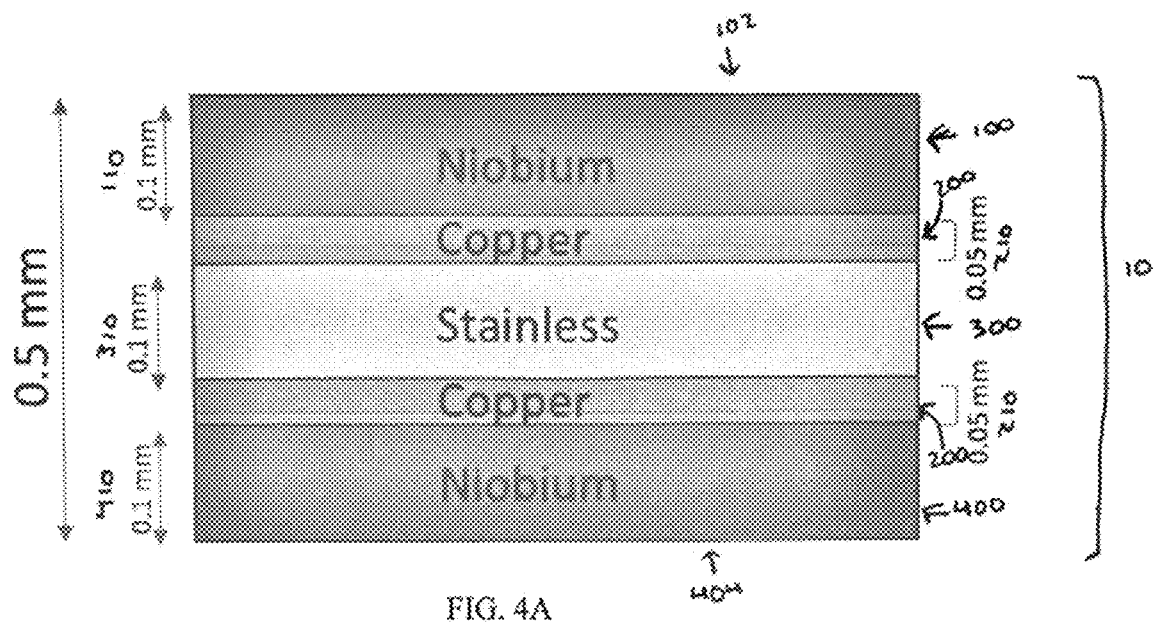
FIGS. 4A-4B display diagrams of exemplary embodiments of the present disclosure.
Figure 4B:
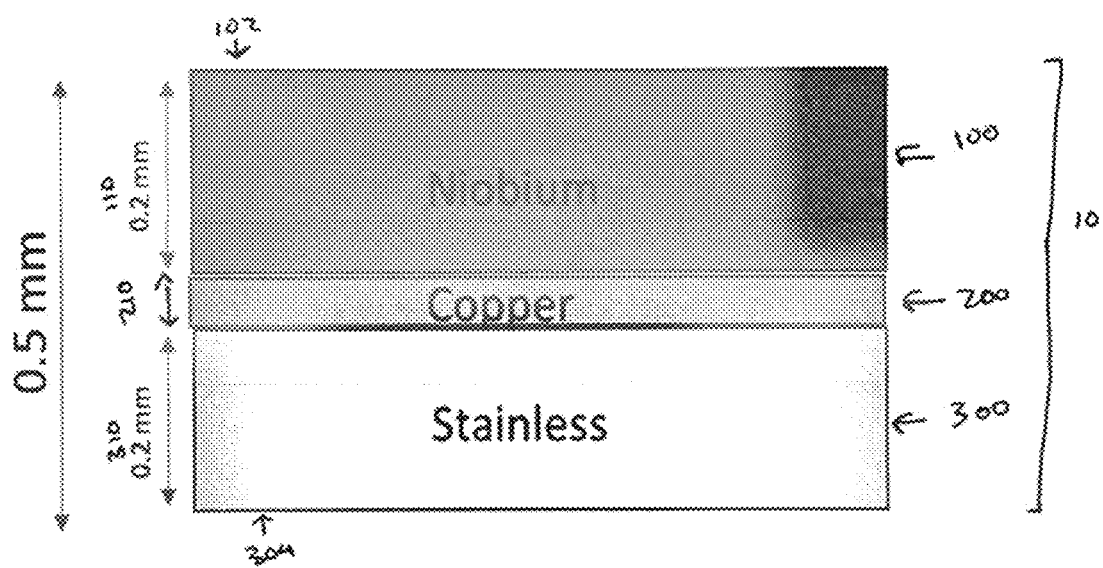

Exemplary clad systems 10 are shown in FIGS. 4A-4B. FIG. 4A displays an exemplary clad system 10 comprising three layers of various materials and thicknesses and two liners. The clad system of FIG. 4A comprises a first layer 100 of niobium, a liner 200 of copper, a second layer 300 of stainless steel, an additional liner 200 of copper, and a third layer 400 of niobium. The third layer 400 comprises two surfaces 402, 404 and a thickness 410. Such a clad system 10 would prove useful in an application where the properties of a material such as niobium (e.g. corrosion resistance, acid tolerance, oxide layer formation, high drawability, and the like) are required on two outer surfaces (e.g. 102, 404). As a non-limiting example, such a system 10 is useful in applications where a system 10 is completely immersed in a corrosive (e.g., highly acidic) environment.

FIG. 4B displays an exemplary clad system 10 comprising two layers of various materials and thicknesses and a liner. The clad system of FIG. 4B comprises a first layer 100 of niobium, a liner 200 of copper, and a second layer 300 of stainless steel. Such a clad system 10 would prove useful in an application where the properties of a material such as niobium (e.g. corrosion resistance, acid tolerance, oxide layer formation, high drawability, and the like) are required on one outer surface (e.g. 102). FIGS. 4A-4B are merely exemplary and should not be limiting.

The present disclosure relates to a method of bonding. In such an aspect, bonding may be selected from any process known in the art for achieving close contact of two materials. In an additional aspect, bonding methods that avoid formation of oxide layers during the process may be utilized. In such an aspect, the prevention of oxide formation allows for an ideal bond strength between layers and maximum strength (e.g. tensile, yield, and the like) of a final clad system 10. In such an aspect, bonding processes occurring at room temperature with minimal heat may prevent oxide formation, though other methods of preventing oxide formation are known in the art. As non-limiting examples, bonding may be selected from processes including but not limited to cold rolling, plating, and other such methods known in the art. Such bonding may comprise bonding a first layer 100, a liner 200, and a second layer 300, as shown in FIG. 3. Such bonding may result in the formation of a clad system 10, wherein intermetallic formation between a first layer 100 and a second layer 300 is prevented. Prevention of intermetallic formation may be achieved by use of a liner 200. Clad systems 10 may be configured to be used in a variety of processes. Such processes may require corrosion resistance. As a non-limiting example, an electrochemical environment that requires protection of the surface of an anode and a cathode due to a number of factors (e.g. acidic process conditions, high temperature applications, etc.) may require a clad system 10 with corrosion resistance. As non-limiting examples, additional processes may comprise processes occurring in batch reactors, processes occurring in acid reactors, processes occurring in batteries, and other such processes known in the art. Battery processes may comprise processes occurring in Polymer Electrolyte Membrane Fuel Cells (PEMFC), though other battery and fuel cell processes may be included, as well.

Although several aspects have been disclosed in the foregoing specification, it is understood by those skilled in the art that many modifications and other aspects will come to mind to which this disclosure pertains, having the benefit of the teaching presented in the foregoing description and associated drawings. It is thus understood that the disclosure is not limited to the specific aspects disclosed hereinabove, and that many modifications and other aspects are intended to be included within the scope of any claims that can recite the disclosed subject matter. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A clad system comprising:
   a. a first layer of niobium;
   b. a second layer of stainless steel; and
   c. a liner consisting of a single metal, wherein the first layer, the liner, and the second layer are cladded to one another, with the liner adjacent to and between the first layer and the second layer, to create the clad system, wherein the liner is configured to allow the clad system to be resistant to forming intermetallics between the first layer and the second layer, and wherein the single metal of the liner comprises an elevated melting temperature compared to the first and second layers, preventing the liner from substantially diffusing into the first layer or the second layer.

2. The clad system of claim 1, wherein the first layer comprises a thickness of about 0.25 mm up to about 5 mm.

3. The clad system of claim 1, wherein the first layer is corrosion resistant and is capable of forming an oxide layer.

4. The clad system of claim 1, wherein the liner comprises a thickness of about 0.05 mm up to about 3 mm.

5. The clad system of claim 1, wherein the liner prevents formation of an intermetallic between the first layer and the second layer.

6. The clad system of claim 5, wherein the clad system does not form intermetallics during heat treatment, annealing, cold rolling, and plating.

7. The clad system of claim 1, wherein the second layer comprises a thickness of about 0.25 mm up to about 5 mm.

8. A method of forming a clad material resistant to formation of an intermetallic, the method comprising:
   a. providing a first layer of niobium;
   b. providing a liner consisting of a single metal;
   c. providing a second layer of stainless steel; and
   d. bonding the first layer, the liner, and the second layer together to form a clad material, with the liner between the first layer and the second layer to prevent formation of the intermetallic between the first and second layer, wherein the single metal of the line comprises an elevated melting temperature compared to the first layer and the second layer, preventing the liner from substantially diffusing into the first layer or the second layer.

9. The method of claim 8, wherein formation of an intermetallic between the first layer and the second layer is prevented during processes selected from a group consisting of heat treatment and annealing.

10. The method of claim 8, wherein bonding comprises cold roll bonding and plating.

* * * * *